(12) United States Patent
Van De Peppel

(10) Patent No.: US 11,814,790 B2
(45) Date of Patent: Nov. 14, 2023

(54) **MULTI-STEP PROCESS FOR THE ISOLATION OF COMPONENTS FROM *MISCANTHUS***

(71) Applicant: EXEGI IP MANAGEMENT B.V., Zevenaar (NL)

(72) Inventor: Marcel Van De Peppel, Renkum (NL)

(73) Assignee: EXEGI IP MANAGEMENT B.V., Zevenaar (NL)

( * ) Notice: Subject to any disclaimer, the term of this patent is extended or adjusted under 35 U.S.C. 154(b) by 510 days.

(21) Appl. No.: 16/772,298

(22) PCT Filed: Dec. 15, 2018

(86) PCT No.: PCT/NL2018/050844
§ 371 (c)(1),
(2) Date: Jun. 12, 2020

(87) PCT Pub. No.: WO2019/117724
PCT Pub. Date: Jun. 20, 2019

(65) Prior Publication Data
US 2021/0095421 A1    Apr. 1, 2021

(30) Foreign Application Priority Data
Dec. 15, 2017   (NL) ...................................... 2020102

(51) Int. Cl.
*D21C 3/26* (2006.01)
*D21C 3/20* (2006.01)
(Continued)

(52) U.S. Cl.
CPC .............. *D21C 3/26* (2013.01); *C04B 18/248* (2013.01); *C07G 1/00* (2013.01); *C08L 1/02* (2013.01);
(Continued)

(58) Field of Classification Search
CPC . D21C 3/003; D21C 1/02; D21C 3/02; D21H 11/12
See application file for complete search history.

(56) References Cited

U.S. PATENT DOCUMENTS

| | | | |
|---|---|---|---|
| 4,670,098 A | 6/1987 | Thorsell et al. | |
| 9,260,818 B2 * | 2/2016 | Shin | D21C 7/00 |

FOREIGN PATENT DOCUMENTS

| | | |
|---|---|---|
| WO | 2014/126471 | 8/2014 |
| WO | 2014/159877 | 10/2014 |

OTHER PUBLICATIONS

Cappelletto et al., Papermaking pulps from the fibrous fraction of Miscanthus x Giganteus, 2000, Industrial Crops and Products, 11, p. 205-210. (Year: 2000).*

(Continued)

*Primary Examiner* — Anthony Calandra
(74) *Attorney, Agent, or Firm* — NIXON & VANDERHYE P.C.

(57) ABSTRACT

The invention relates to a process for the isolation of components from plant material of *Miscanthus*. The process comprises three subsequent extractions. The first extraction yields an extract comprising one or more compounds selected from the group of antioxidants, polyphenols, proteins, sterols, acids, alcohols, ketones, aldehydes and aromatic compounds. Thereafter, the plant material is subjected to two extractions with a metal hydroxide (e.g. NaOH), the first performed at a lower pH than the second. These steps yield a sugar fraction and a lignin fraction, respectively. Finally, from the residue after the third extraction, cellulose is isolated.

25 Claims, 2 Drawing Sheets

(51) Int. Cl.
*D21H 11/12* (2006.01)
*D21C 3/00* (2006.01)
*D21C 1/02* (2006.01)
*C04B 18/24* (2006.01)
*C07G 1/00* (2011.01)
*C08L 1/02* (2006.01)
*C08L 97/00* (2006.01)
*D21C 3/02* (2006.01)
*D21C 3/04* (2006.01)
*D21C 11/00* (2006.01)

(52) U.S. Cl.
CPC .............. *C08L 97/005* (2013.01); *D21C 1/02* (2013.01); *D21C 3/003* (2013.01); *D21C 3/02* (2013.01); *D21C 3/04* (2013.01); *D21C 3/20* (2013.01); *D21C 11/0007* (2013.01); *D21C 11/0035* (2013.01); *D21C 11/0057* (2013.01); *D21H 11/12* (2013.01); *C08L 2205/16* (2013.01)

(56) References Cited

OTHER PUBLICATIONS

Danielewicz et al., Selected Grass Plants as Biomas Fuels and Raw Material for Papermaking, Par II. Pulp and Paper Properties, 2015, BioResources, 10(4), p. 8552-8564 (Year: 2015).*
International Search Report for PCT/NL2018/050844 dated Mar. 14, 2019, 3 pages.
Written Opinion of the ISA for PCT/NL2018/050844 dated Mar. 14, 2019, 6 pages.

* cited by examiner

MULTI-STEP PROCESS FOR THE ISOLATION OF COMPONENTS FROM *MISCANTHUS*

CROSS-REFERENCE TO RELATED APPLICATIONS

This application is the U.S. national phase of International Application No. PCT/NL2018/050844 filed Dec. 15, 2018 which designated the U.S. and claims priority to NL Patent Application No. 2020102 filed Dec. 15, 2017, the entire contents of each of which are hereby incorporated by reference.

FIELD

The invention relates to a process for the isolation of components from plant material of *Miscanthus* and to products obtainable by such process.

BACKGROUND AND SUMMARY

Fueled by growing concerns about the environment and the increasing demand for natural products to sustain and enhance human life, there is an increasing interest to cultivate specific agricultural crops and develop efficient processes wherein these crops are fractionated into a plurality of useful components—not only commodities such as cellulose, lignin, starch and sugars, but also more valuable components that are present in minor amounts, such as antioxidants, proteins, sterols, fatty acids, fatty alcohols, aromatic compounds and other naturally occurring compounds.

By choosing an appropriate crop and finding an efficient method for processing it, the need for a variety of useful products can be fulfilled in manner that has a lower impact on the environment, that generates less (agricultural) waste, and wherein there is less competition with the cultivation of food crops on the available agricultural land.

It has now been found that with a particular processing of a particular crop, a plurality of useful products can be obtained in an efficient manner.

Accordingly, the present invention relates to a process for the isolation of components from plant material of *Miscanthus*, the process comprising
    providing plant material of *Miscanthus*; then
    subjecting the plant material to an extraction with a first extraction solvent to yield a first residue and a first extract, the first extract comprising one or more compounds selected from the group of antioxidants, polyphenols, proteins, sterols, acids, alcohols, ketones, aldehydes and aromatic compounds; then
    subjecting the first residue to an extraction with a second extraction solvent to yield a second residue and a second extract, wherein the second extraction solvent comprises an aqueous solution of one or more metal hydroxides selected from the group of LiOH, NaOH and KOH, wherein the total concentration of the one or more metal hydroxides is in the range of 0.15-1.50 M; then
    subjecting the second residue to an extraction with a third extraction solvent to yield a third residue and a third extract, wherein the third extraction solvent comprises an aqueous solution of one or more metal hydroxides selected from the group of LiOH, NaOH and KOH, wherein the total concentration of the one or more metal hydroxides is at least 2.5 M.

DETAILED DESCRIPTION

Figure 1:
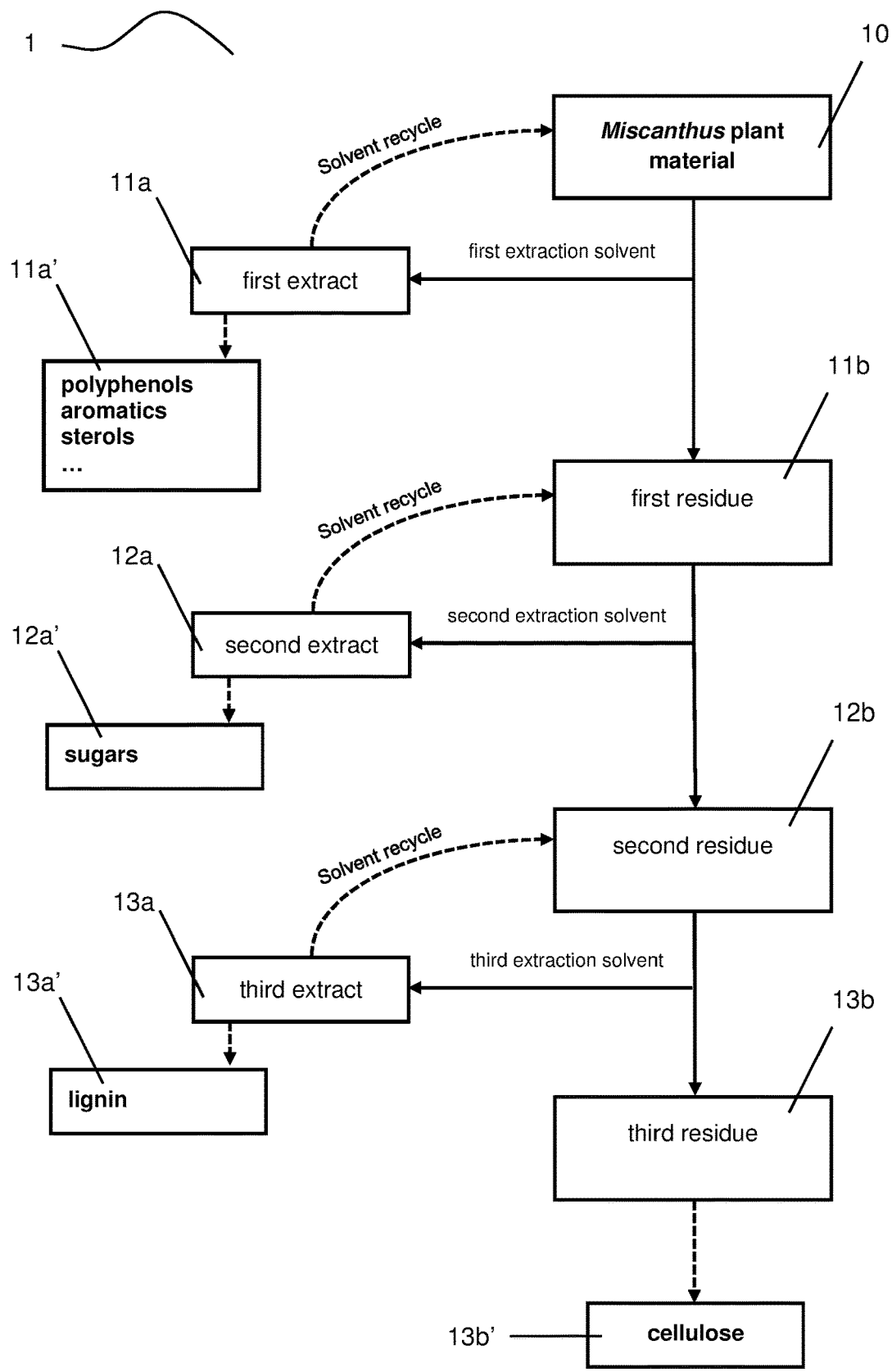
FIG. 1 displays a schematic representation of the process (1) of the invention.

The genus *Miscanthus* is a non-food crop known for its excellent productivity, rapid growth, and high resistance to disease. Because of their perennial nature and high productivity, *Miscanthus* species are very attractive biomass sources for the generation of energy. Other components that naturally occur in *Miscanthus*, however, have remained under-exposed. It has now surprisingly been found, that a range of valuable products can easily and efficiently be obtained from *Miscanthus* by a series of subsequent selective extractions.

In principle, any species of *Miscanthus* may be used, for example a species selected from the group of *Miscanthus changii*, *Miscanthus depauperatus*, *Miscanthus ecklonii*, *Miscanthus floridulus*, *Miscanthus fuscus*, *Miscanthus giganteus*, *Miscanthus junceus*, *Miscanthus nepalensis*, *Miscanthus nudipes*, *Miscanthus oligostachyus*, *Miscanthus sacchariflorus*, *Miscanthus sinensis*, *Miscanthus tinctorius* and *Miscanthus violaceus*. Preferably, *Miscanthus giganteus* is used, which is a sterile hybrid of *Miscanthus sinensis* and *Miscanthus sacchariflorus*.

The extraction with a first extraction solvent has the purpose of isolating one or more particular compounds (extractives) from the plant material. The extract obtained from this extraction is named the first extract. In case a plurality of extractions are performed with the first extraction solvent (batchwise extraction), the first extract consists of the combined extracts from the plurality of extractions.

The extraction with a first extraction solvent is in particular directed at the isolation of a range of compounds that occur at low concentrations in *Miscanthus*, typically compounds that are present at a concentration of less than 1 g per kilogram of dry *Miscanthus* material. The entire fraction (dry matter) obtained after the extraction with the first extraction solvent may correspond to an amount of 1-25 g per kilogram of dry *Miscanthus* material. Usually, however, it corresponds to an amount of 5-15 g per kilogram of dry *Miscanthus* material.

The extraction with a first extraction solvent may be performed directly on the harvested plant material, but it may also be preceded by, for example, a washing step and/or a chopping or grinding step.

Harvested plant material may comprise the dirt that is typically present in an agricultural field, such as sand, soil, organic material not belonging to the harvested crop, microorganisms (such as yeasts and bacteria), fertilizer or manure. Such contaminations may interfere with the process, and eventually end up in one of the isolated components. Therefore, the plant material in a process of the invention is usually cleaned before it is used in the process. This may be performed by washing it with water, for example by making use of a high speed water spray. The exact cleaning process depends on the nature and degree of contamination.

For the ease of handling, the plant material usually is chopped into pieces, e.g. with a largest dimension in the range of 0.5-150 mm. In particular, it may be in the range of 1.0-100 mm, in the range of 2.0-50 mm, in the range of 3.0-25 mm, in the range of 4.0-10 mm or in the range of 0.50-4.0 mm. It appeared that grinding the material into smaller pieces, e.g. with a largest dimension in the range of 0.5-2 mm, did not result in a higher yield of polyphenols than grinding it into larger pieces, e.g. with a largest dimension in the range of 5-10 mm. Moreover, a high degree of grinding has been shown to damage the cellulose fibers, which is unfavorable for particular purposes, e.g. in the manufacture of paper or for fiber-reinforced polymers.

The first extract comprises one or more compounds selected from the group of antioxidants (such as polyphenols), proteins, sterols, acids (such as saturated fatty acids, unsaturated fatty acids and alpha-hydroxy acids), alcohols (such as saturated fatty alcohols and unsaturated fatty alcohols), ketones, aldehydes and aromatic compounds. The compounds in the first extract are generally characterized as lipophilic compounds, since they are typically obtained by extraction with an organic solvent, or with a mixture of water with an organic solvent wherein the water is present in less than 50 wt. %.

By aromatic compounds are meant compounds that comprise in their molecular structure a functional group or substituent derived from an aromatic ring, usually an aromatic hydrocarbon group, for example a substituted or unsubstituted phenyl group. In particular, an extracted aromatic compound may be a phenolic compound, more in particular one selected from the group of p-coumaric acid, vanillic acid, p-hydroxybenzaldehyde and vanillin.

The first extract may in particular comprise one or more compounds selected from the group of hexanoic acid, heptanoic acid, octanoic acid, nonanoic acid, decanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hexadecenoic acid, cis-9-octadecenoic acid, 2-hydroxyeicosanoic acid, 2-hydroxydocosanoic acid, 2-hydroxytricosanoic acid, 2-hydroxytetracosanoic acid, benzoic acid, p-hydroxybenzaldehyde, resorcinol, vanillin, 4-hydroxybenzoic acid, syringaldehyde, vanillic acid, 4-hydroxy-3-methoxycinnamaldehyde, 3-vanillylpropanol, syringic acid, 1-guaiacyl-2-hydroxyethanone, p-coumaric acid, 3,5-dimethoxy-4-hydroxy cinnamaldehyde, guaiacyl glyoxylic acid, 2-hydroxy-1-syringylethanone, ferulic acid, vanillylethanediol, campesterol, stigmasterol, β-sitosterol, stigmasta-3,5-dien-7-one, stigmast-4-en-3-one, stigmast-6-en-3,5-diol, 7-hydroxy-f3-sitosterol, 7-oxo-f3-sitosterol, hexacosan-1-ol, heptacosan-1-ol, pentacosan-1,2-diol, octacosan-1-ol, pentadecan-2-one, heptacosane and octacosanal.

The first extraction solvent may consist of one solvent, or be a mixture of two or more different solvents. In case the first extraction solvent is a mixture of two or more solvents, it is preferred that all these solvents mutually dissolve, so that the first extraction solvent is a homogeneous mixture.

The first extraction solvent is chosen such that it is capable of extracting one or more of the abovementioned extractives, in particular that it is capable of extracting lipophilic compounds. To this end, the first extraction solvent usually comprises one or more solvents selected from the group of acetone, acetonitrile, chloroform, dichloromethane, ethyl acetate, diethylether, dimethylformamide, dimethyl sulfoxide, dioxane, ethanol, methanol, 1-propanol, 2-propanol, tetrahydrofuran and water.

Preferably, the first extraction solvent is a mixture of water and an alcohol, wherein the alcohol constitutes at least 30 wt. % of the mixture and is dissolved in the water. The alcohol is then in particular an alcohol with 1, 2 or 3 carbon atoms (a C1, C2 or C3 alcohol), more in particular an alcohol selected from the group of methanol, ethanol, 1-propanol, 2-propanol, ethanediol, 1,2-propanediol and 1,3-propanediol. The alcohol constituting at least 30 wt. % of the mixture may also be a mixture of alcohols, for example a mixture of methanol and ethanol. In particular, the first extraction solvent is a solvent essentially consisting of water and one or more alcohols, wherein the one or more alcohols constitute at least 30 wt. % of the mixture.

More preferably, the first extraction solvent comprises at least 30 wt. % of ethanol and 70 wt. % or less of water. In such case, the first extraction solvent is preferably a mixture comprising ethanol and water in a weight ratio in the range of 35:65 to 100:0.0, more preferably in the range of 60:40 to 99.0:1.0, even more preferably in the range of 65:35 to 85:15. It is in principle possible that such mixture comprises one or more further components in minor amounts, e.g. one or more of the other alcohols mentioned hereinabove.

In particular, the first extraction solvent is a solvent essentially consisting of water and ethanol, wherein the ethanol constitutes at least 30 wt. % of the mixture. Preferably, the ethanol constitutes 45-99 wt. % of such solution. More preferably, it constitutes 55-95 wt. % of such solution and even more preferably it constitutes 60-85 wt. % of such solution.

Because the first extraction solvent is preferably separated from the extractives by evaporation, it is advantageous for the energy-efficiency of the process that the boiling point of the first extraction solvent is as low as possible. This requirement is usually met by using a solvent selected from the group of C1-C3 alcohols, acetone, chloroform, dichloromethane, ethyl acetate, diethylether, dioxane and tetrahydrofuran. Less suitable solvents in this respect are acetonitrile, dimethylformamide and dimethyl sulfoxide, because these have significantly higher boiling points.

On the other hand, when compatibility with food processing is desired, it is preferred to use ethanol. Solvents that are preferably avoided for this purpose are, for example, chloroform, dichloromethane, acetonitrile, methanol and ethanediol.

The extraction with the first extraction solvent may be performed at a temperature in the range of 0-100° C. It may be 90° C. or less, 80° C. or less or 70° C. or less. In particular it is at a temperature in the range of 10-60° C., more in particular at a temperature in the range of 20-50° C. When it is aimed to obtain certain compounds that are sensitive to higher temperatures, then the extraction is preferably performed at a temperature that is as low as possible. For example, polyphenols appear to be sensitive to degradation at increased temperatures, e.g. above 35° C. An extraction at lower temperatures, on the other hand, appears to be less effective. As a balance, the temperature is preferably in the range of 10-40° C., more preferably in the range of 15-35° C. or in the range of 20-30° C. In particular, when the first extraction solvent is a 55-95 wt. % solution of ethanol in water, or a 60-85 wt. % solution, then the temperature is also preferably in the range of 10-40° C., more preferably in the range of 15-35° C. or in the range of 20-30° C. In principle, during an evaporation of the first extraction solvent, the temperature of the first extract (including the extractives therein) is also in the same range as during the extraction itself, e.g. in the range of 10-40° C., in the range of 15-35° C., in the range of 20-35° C. or in the range of 20-30° C.

The extraction with the first extraction solvent may be performed at atmospheric pressure, but also at a higher pressure, for example at a pressure of up to 10 bar. The pressure may be 7 bar or less, 5.0 bar or less, 4.0 bar or less, 3.0 bar or less, or 2.0 bar or less. At pressures higher than 1.0 bar, it is possible to apply extraction temperatures that lie above the normal boiling point of ethanol, for example temperatures in the range of 80-100° C.

The extraction with the first extraction solvent may be performed batch wise or in a continuous manner. In case it is performed batch wise, then a plurality of extractions is performed, wherein the resulting extracts are combined to form the first extract. As can be expected, in each subsequent extraction the amount of extractives is usually less than that in the previous extraction. Depending on the degree of such decay and the energy required for the evaporation, the number of extractions may be in the range of 1-10, usually it is in the range of 2-4.

In case of a continuous extraction process, the extraction solvent is preferably recycled by evaporation, as in e.g. a soxhlet extraction. The amount of extraction solvent is then usually in the range of 3-30 mL per gram of plant material, preferably in the range of 5-20 mL per gram of plant material. The duration of an extraction directed at the isolation of polyphenols is typically in the range of 1.0-3.0 hours. The temperature applied is then typically in the range of 20-35° C.

In the extraction with the first extraction solvent, the solid phase (solid plant material) is separated from the dissolved phase (the extract comprising the extractives) to yield a first residue and a first extract, respectively. This separation is usually performed by methods known in the art. Whereas on a smaller scale it is possible to perform a filtration over a piece of filter paper or a sintered glass funnel with a with a porous filter plate, on a larger scale it is preferred to make use of a centrifugation.

The extraction with a second extraction solvent, performed on the first residue, has the purpose of isolating sugars from the *Miscanthus* plant material. To this end, the second extraction solvent is moderately alkaline. It comprises an aqueous solution of one or more hydroxide salts selected from the group of LiOH, NaOH and KOH wherein the total concentration of the one or more hydroxide salts is in the range of 0.15-1.5 M. In particular, the concentration of the one or more salts is in the range of 0.20-1.20 M. Since the one or more hydroxide salts may be present as a mixture of two or three hydroxide salts, the term "total concentration" is used. The total concentration may also be 1.4 M or less, 1.3 M or less, 1.2 M or less, 1.0 M or less, 0.80 M or less, 0.60 M or less, 0.40 M or less or 0.20 M or less.

When the *Miscanthus* plant material of the first residue is subjected to these conditions, the hemicellulose hydrolyses to form sugars that dissolve in the moderately alkaline solvent. At the same time, these conditions do not degrade these sugars, neither do they negatively affect the lignin of the *Miscanthus* (e.g. the lignin does not hydrolyze and dissolve into the second extract), or at least these conditions do not negatively affect the lignin to a significant extent. Moreover, the lignin does barely dissolve under these conditions, so the sugars obtained by the extraction with the second extraction solvent only contain small amounts of lignin. In contrast, the lignin dissolves well in the third extraction solvent (vide infra) which is primarily due to its higher alkalinity. Thus, the difference in hydroxide concentration of both extraction solvents has the effect that there is a selective separation of the lignin from the sugars.

The alkali in the second extraction solvent acts as a catalyst for the hydrolysis of the hemicellulose and is not stoichiometrically consumed. It is preferred that at the start of the extraction, there is enough hydroxide salt present to accommodate for small losses due to neutralization or dilution by e.g. the first residue. For example, when a 25 mM NaOH solution is used (approx. 0.1 m % NaOH), for each gram of *Miscanthus* (dry-matter content) the amount of this solution that is used is typically at least 10 or at least 15 mL.

In the extraction with the second extraction solvent, the solid phase (originating from the solid plant material of the first residue) is separated from the dissolved phase (the extract comprising the dissolved sugars) to yield a second residue and a second extract, respectively. This is usually performed by methods known in the art. Whereas on a smaller scale it is possible to perform a filtration over a piece of filter paper or a sintered glass funnel with a with a porous filter plate, on a larger scale it is preferred to make use of a centrifugation.

The second extract typically comprises a plurality of sugars, such as arabinose, xylose, mannose, galactose, glucose and rhamnose. The sugar with the most prominent presence is xylose.

The extraction with the second extraction solvent may in principle be performed at any temperature, as long as there is no substantial degradation (or degradation to an undesired extent) of the products formed during the hydrolysis and the extraction (e.g. the second extract; and the lignin and cellulose remaining in the second residue). Usually, however, the temperature is in the range of 0-120° C. It may also be in the range of 10-110° C. or in the range of 20-100° C. Preferably, the temperature is in the range of 30-90° C., more preferably it is in the range of 40-80° C. It is even more preferably in the range of 50-70° C. At this temperature, there is a fast and effective hydrolysis of the hemicellulose while undesired side reactions such as product degradation are largely absent. When the temperature is higher than 80° C., the total concentration of the one or more salts is preferably not higher than 1.3 M, more preferably not higher than 1.2 M.

The extraction with the second extraction solvent may be performed at atmospheric pressure, but also at a higher pressure, for example at a pressure of up to 10 bar. The pressure may be 7 bar or less, 5.0 bar or less, 4.0 bar or less, 3.0 bar or less, or 2.0 bar or less.

The second extraction solvent may comprise ethanol, for example in an amount of 10-50 wt. %, or in an amount of 20-40 wt. %. An advantage of the presence ethanol in the second extraction solvent is that it leads to a better defibring of the cellulose and that it contains less residual lignin after the extraction with the third extraction solvent (lower kappa number). In case ethanol is present, the concentration of the one or more salts is then still related to the total amount of water and ethanol present.

The extraction with the second extraction solvent may be performed batch wise or in a continuous manner. The amount of extraction solvent is then usually in the range of 3-30 mL per gram of first residue, preferably in the range of 5-20 mL per gram of first residue. In case it is a continuous process, it may be performed in a countercurrent or concurrent fashion, followed by a solid-liquid separation.

The second extract may undergo a further treatment, for example a treatment directed at the isolation of the sugars and/or at the recycling of the second extraction solvent. Such treatment may comprise the addition of an acid to the second extract. The isolation of sugars may be performed by means of crystallization, membrane filtration, microfiltration, ultrafiltration, nanofiltration or preparative chromatographic methods such as preparative column chromatography. Removal of traces of lignin can be performed by membrane filtration, which traces can at a later stage be added to the lignin fraction that is obtained by the subsequent extraction with a third extraction solvent.

The extraction with a third extraction solvent, performed on the second residue, has the purpose of isolating lignin from the *Miscanthus* plant material. To this end, the second extraction solvent is strongly alkaline. It comprises an aqueous solution of one or more salts selected from the group of LiOH, NaOH and KOH, wherein the concentration of the one or more hydroxide salts is at least 2.5 M. When the *Miscanthus* plant material of the second residue is subjected to these conditions, the lignin dissolves into the strongly alkaline solvent and is so released from the insoluble cellulose.

In the extraction with the third extraction solvent, the solid phase (originating from the solid plant material of the second residue) is separated from the dissolved phase (the extract comprising the dissolved lignin) to yield a third residue and a third extract, respectively. This is usually performed by methods known in the art. Whereas on a smaller scale it is possible to perform a filtration over a piece of filter paper or a sintered glass funnel with a with a porous filter plate, on a larger scale it is preferred to make use of a centrifugation.

The third extraction may in principle be performed at any temperature, as long as there is no substantial degradation (or degradation to an undesired extent) of the products formed during the hydrolysis and the extraction (e.g. the third extract and the cellulose remaining in the third residue). Usually, however, the temperature is in the range of 0-120° C. It may also be in the range of 10-110° C. or in the range of 20-100° C. Preferably, the temperature is in the range of 30— 90° C., more preferably it is in the range of 40-80° C. It is even more preferably in the range of 50-70° C. At this temperature, there is a fast and effective dissolution of the lignin while undesired side reactions such as product degradation are largely absent.

The extraction with the third extraction solvent may be performed at atmospheric pressure, but also at a higher pressure, for example at a pressure of up to 10 bar. The pressure may be 7 bar or less, 5.0 bar or less, 4.0 bar or less, 3.0 bar or less, or 2.0 bar or less.

Independently of the second extraction solvent, the third extraction solvent may also comprise ethanol, for example in an amount of 10-50 wt. %, or in an amount of 20-40 wt. %. An advantage of the presence ethanol in the third extraction solvent is that it leads to a better defibring of the cellulose and that it contains less residual lignin after the extraction with the third solvent (lower kappa number). In case ethanol is present, the concentration of the one or more salts is then still related to the total amount of water and ethanol present.

The extraction with the third extraction solvent may be performed batch wise or in a continuous manner. The amount of extraction solvent is then usually in the range of 3-30 mL per gram of second extract, preferably in the range of 5-20 mL per gram of second extract. In case it is a continuous process, it may be performed in a countercurrent or cocurrent fashion, followed by a solid-liquid separation.

The extraction with a third extraction solvent is in principle performed at any concentration of the one or more hydroxide salts that is equal to or higher than 2.5 M, in particular it is in the range of 4.5-20.0 M. It may also be 2.7 M or more, 3.0 M or more, 3.5 M or more, 4.0 M or more, 4.5 M or more, 5.0 M or more, 6.0 M or more, 7.0 M or more, 8.0 M or more, 9.0 M or more, 10.0 M or more, 11.0 M or more, 12.0 M or more, 13.0 M or more, 14.0 M or more, 15.0 M or more, 16.0 M or more, 17.0 M or more, 18.0 M or more, 19.0 M or more, or 20.0 M or more. Since the one or more hydroxide salts may be present as a mixture of two or three hydroxide salts, the term "total concentration" is used.

During the extraction with the third extraction solvent, alkali in the third extraction solvent is consumed. This may significantly reduce the concentration of dissolved hydroxide, and may thus also lead to a reduced pH. When the drop of the pH is too high (e.g. close to or below neutral pH) before the extraction is finished, the capacity of the third extraction solvent to hydrolyze the lignin and defibre the cellulose may be decreased. Otherwise, a decreased pH is not necessarily a problem. It may even be an advantage, because when an eventual neutralization is carried out on the third extract, less acid is required to reach the desired drop in pH. The amount of third extraction solvent is therefore preferably chosen such that at the end of the extraction the pH is still alkaline, e.g. higher than 7.0. Preferably, the pH is at a value that does not result in precipitation of the lignin. It may for example also be 7.5 or higher, 8.0 or higher, 8.5 or higher 9.0 or higher, 9.5 or higher, 10.0 or higher, 10.5 or higher, 11.0 or higher, 11.5 or higher or 12.0 or higher.

When it is desired to form a third extract that is still alkaline, it is preferred that at the start of the extraction, the amount of hydroxide salt present is at least 2.5 mmole per gram of second residue, based on the dry-matter content. For example, when a 2.5 M NaOH solution is used (approx. 10 m % NaOH), the amount of this solution that is then used is at least 9 mL for each gram of *Miscanthus* (dry-matter content).

The third extract may undergo a further treatment, for example a treatment directed at the isolation of lignin. Such treatment may comprise the addition of an acid to the third extract. In this way, the extract may be neutralized.

When acid is added to the third extract, at least part of the lignin precipitates. This makes it possible to separate the lignin from the aqueous supernatant. This supernatant comprises the salt that is formed during the addition of acid. Any remaining salts in the lignin can then be removed by washing the lignin with a liquid, typically water. The washed lignin can then be dried to yield the lignin as a powder or a paste.

The supernatant and eventual washing layers that have been added thereto form a concentrate of dissolved lignin and salts, in particular one or more salts selected from the group of lithium salts, sodium salts and potassium salts. If desired, the residual lignin can be isolated from the solution and the salt or salts can be regenerated.

As already stated, the process may comprise the addition of an acid to the second extract and/or the third extract. In this way, the pH of the extract may be reduced to less basic, to neutral or to acidic. The applied acid may in principle be any suitable acid.

It has been found that the addition of carbon dioxide ($CO_2$) is particularly advantageous, because it appeared possible to regenerate the metal hydroxide (LiOH, NaOH or KOH) as well as the $CO_2$ in a simple and efficient manner from the solution. This regeneration can be performed on the second extract and/or on the third extract in a similar manner, as is elaborated below.

Upon the addition of $CO_2$ to the second and/or third extract, the $CO_2$ is converted into a dissolved metal carbonate salt. Depending on the metal hydroxide (LiOH, NaOH or KOH) used in the respective second or third extraction solvent, the metal carbonate salt is $Li_2CO_3$, $Na_2CO_3$ or $K_2CO_3$. After the addition of calcium oxide (CaO) and/or calcium hydroxide ($Ca(OH)_2$) to the dissolved metal carbonate salt, a salt metathesis reaction occurs wherein the carbonate precipitates as $CaCO_3$ under the formation of a supernatant comprising a dissolved metal hydroxide, wherein the metal corresponds to the metal of the metal hydroxide initially used in the second or third extraction solvent—LiOH, NaOH or KOH. In this way, the metal hydroxide that has been used in the second and/or third extract, can be regenerated. When brought at the appropriate concentration in water, it is available for re-use in the process of the invention, in particular in the steps wherein the first or the second residue are subjected to the extraction.

In another step, the $CaCO_3$ may be converted into $CO_2$ on the one hand and into CaO and/or $Ca(OH)_2$ on the other hand, for example by burning the $CaCO_3$. In this way, the $CO_2$ as well as the CaO and/or $Ca(OH)_2$ are also regenerated and so become available for re-use in the process of the invention. Despite the quantitative use of metal hydroxide in the process of the invention, there is no quantitative formation of metal waste, which is a drawback of many conventional processes wherein biomass is treated to separate and isolate its components such as lignin, cellulose and hemicellulose.

Thus, in a process of the invention, the process may comprise a treatment of the second extract wherein the second extraction solvent is regenerated from the second extract, the treatment comprising the steps of a) adding $CO_2$ to the second extract to reach a pH in the range of 6-11; then
b) separating the resulting composition into a first fraction containing sugars and a second fraction containing an aqueous metal carbonate solution, wherein the metal carbonate solution comprises one or more carbonates selected from the group of $Li_2CO_3$, $Na_2CO_3$ and $K_2CO_3$; then
c) adding CaO and/or $Ca(OH)_2$ to the second fraction to generate precipitated $CaCO_3$ and to regenerate the second extraction solvent; then
d) burning the precipitated $CaCO_3$ to regenerate $CO_2$ and CaO; then
e) using the regenerated $CO_2$ in step a) and/or using the regenerated CaO in step c); and
f) optionally subjecting the first fraction to one or more purification steps to isolate one or more sugars, in particular xylose; and
g) optionally subjecting the first residue to an extraction with the regenerated second extraction solvent.

The aqueous metal carbonate solution generated in step a) and separated in step b) is a solution of one or more metal carbonates selected from the group of $Li_2(CO_3)$, $Na_2(CO_3)$ and $K_2(CO_3)$. The actual metal carbonate (or combination thereof) that is present depends on the metal hydroxide(s) used in the second extraction solvent. For example, when NaOH has been used in the second extraction solvent, the metal carbonate that is formed after the addition of $CO_2$ is sodium carbonate. Logically, the abundancy of the lithium, sodium and potassium counter ions is also reflected in the composition of the second extraction solvent that is regenerated in step c).

Preferably, when acid is added during the isolation of the lignin, the addition of acid should not only result in the precipitation of the lignin, but also make it acidic so that the lignin becomes protonated. When the acid that is added to the third extract is $CO_2$, it is preferred to add an amount of a (diluted) acid that is stronger than $CO_2$, for example $H_2SO_4$. In this way, sufficient protonation of the lignin can be accomplished.

A process of the invention may also comprise a treatment of the third extract wherein the third extraction solvent is regenerated from the third extract, the treatment comprising the steps of a) adding $CO_2$ to the third extract to precipitate the lignin and create a supernatant containing an aqueous metal carbonate solution, wherein the metal carbonate solution comprises one or more carbonates selected from the group of $Li_2CO_3$, $Na_2CO_3$ and $K_2CO_3$; then
b) separating the lignin from the supernatant; then
c) adding CaO and/or $Ca(OH)_2$ to the supernatant to generate precipitated $CaCO_3$ and to regenerate the third extraction solvent; then
d) burning the precipitated $CaCO_3$ to generate $CO_2$ and CaO; then
e) using the regenerated $CO_2$ in step a) and/or using the regenerated CaO in step c); and
f) optionally subjecting the lignin to one or more purification steps. The aqueous metal carbonate solution generated in step a) and separated in step b) is a solution of one or more metal carbonates selected from the group of $Li_2(CO_3)$, $Na_2(CO_3)$ and $K_2(CO_3)$. The actual metal carbonate (or combination thereof) that is present depends on the metal hydroxide(s) used in the third extraction solvent. For example, when KOH has been used in the third extraction solvent, the metal carbonate that is formed after the addition of $CO_2$ is potassium carbonate. Logically, the abundancy of the lithium, sodium and potassium counter ions is also reflected in the composition of the third extraction solvent that is regenerated in step c).

The third residue comprises the cellulose of the *Miscanthus* plant material ("raw cellulose"), together with some other components such as residual lignin and other *Miscanthus* plant materials that have not been extracted by the first, second and third extraction solvents.

Optionally, the raw cellulose obtained by the process of the invention can be purified to yield cellulose. Thus, the process of the invention may be followed by the isolation of cellulose from the third residue. The cellulose may also be isolated as cellulose fibers.

The residual lignin can for example be removed by processing the third residue in a horizontal digester or in an extruder. The process may comprise the pulping of the third residue, followed by bleaching of the third residue.

Other impurities can be removed by one or more separation methods selected from the group of decanting, centrifuging, filtering, evaporating, and washing with a fluid.

For example, the raw cellulose may be washed with water to remove water soluble by-products such as salts and other components that originate from the treated plant material or are formed during the previous steps in the process of the invention. Use may e.g. be made of filtration and/or sedimentation followed by decantation.

Techniques for solid-solid separation that are known in the art may also be applied, in particular to remove non-cellulosic material from the cellulose that does not dissolve in washing fluids such as water.

Usually, the (optional) step of the isolation of the cellulose comprises, or is followed by, the removal of water so that a substantially dry product is obtained. This may be performed by centrifugation or by the evaporation of water, in particular by drying under reduced pressure (usually at a pressure lower than atmospheric pressure). For example, the water content in the isolated cellulose or the cellulose-containing substance is 5 wt. % or less, 4 wt. % or less, 3 wt. % or less, 2 wt. % or less, 1 wt. % or less, 0.5 wt. % or less, 0.2 wt. % or less, 0.1 wt. % or less or 0.05 wt. % or less.

The obtained cellulose is typically obtained as a dry powder or a more tight or stiff solid substance. The appearance of the cellulose usually depends on its purity. It may be a white, off-white, yellow or even brownish substance. In case a white cellulose is desired, the cellulose may be bleached, for example by means of treatment with one or more agents selected from the group of $H_2O_2$ (P-stage), $O_2$(O-stage), $O_3$(P-stage), $Cl_2$(C-stage), $ClO_2$(D-stage), NaOH (E-stage), NaClO (H-stage), EDTA or DPTA (chelating agents, Q-stage), $Na_2S_2O_4$ (Y-stage) The obtained cellulose product may also be modified, for example into dissolving cellulose, cellulose ethers (such as hydroxypropylmethylcellulose), viscose, microcellulose, nanocellulose, nanocrystalline cellulose (NCC or CNC), cellulose nanofibers (CNF), microfibrillated cellulose (MFC), celluloid, microcrystalline cellulose or cellophane.

Advantageously, the tensile strength, the bursting strength and the tear strength of cellulose obtained with a method of the invention are higher than those of conventional hardwood pulp. Also, the tensile strength of cellulose obtained with a method of the invention is higher than that of softwood pulp. The use of cellulose from *Miscanthus* for the manufacture of e.g. paper is therefore attractive.

Moreover, the process for preparing paper from cellulose isolated from *Miscanthus* is less energy-intensive and produces less waste water than the conventional processes that rely on softwood or hardwood pulp as the cellulose source, which is for a great part due to the better dewatering in the case of cellulose isolated from *Miscanthus*— in conventional processes more water needs to be removed by evaporation, especially from softwood. Thus, when *Miscanthus* is used, less softwood is necessary to reach the desired strength, which in turn leads to a more efficient and less energy-demanding dewatering process. In addition, the refinement (grinding) of *Miscanthus* pulp occurs in a manner comparable to that of hardwood pulp, as a result of which no additional grinding energy is required when *Miscanthus* is used.

The exceptional mechanical properties of the cellulose obtained from *Miscanthus* further make this cellulose highly appropriate for application in composite materials.

Another advantage of cellulose isolated from *Miscanthus* is that it has a higher viscosity than hardwood pulp, which widens the range of suitable cellulose ethers that are prepared from cellulose, for example cellulose ethers that serve as a replacement of cotton linters.

The lignin produced by the process of the invention appears to be of a high quality, in particular of a high purity. The lignin is for example substantially free of sulfur or sulfur-containing compounds. From many types of biomass the lignin is isolated by applying harsh conditions under exposure to $Na_2S$ to break the bonds that link lignin, hemicellulose and cellulose (e.g. the kraft process), which results in lignin with bound sulfur. The process of the invention is free of exposure to such sulfur compounds, so lignin with bound sulfur is not formed. This results in a better odor of the lignin (better than that of lignin obtained by e.g. the kraft process). Moreover, this opens the door to other application areas of the lignin, such as foods, personal care products, construction materials and clothing (e.g. fabric or leather).

The main monomers present in the lignin obtained from *Miscanthus* (in particular from *Miscanthus x giganteus*) are sinapyl alcohol, coniferyl alcohol and p-coumaryl alcohol. Due to the relatively mild conditions of a process of the invention, the lignin yield is higher than that obtained with conventional processes wherein more harsh conditions are applied.

With the higher yields of lignin, it is also possible to obtain the sinapyl alcohol, coniferyl alcohol and p-coumaryl alcohol in higher yields. Since the lignin of *Miscanthus* (in particular that of *Miscanthus x giganteus*) is particularly rich in sinapyl alcohol, the process of the invention is particularly suitable to obtain high amounts of sinapyl alcohol of biological origin as well as lignin with a high content of sinapyl alcohol.

The extraction steps of the process of the invention are particularly advantageous with plant material of *Miscanthus*, and especially with that of *Miscanthus giganteus*. When the method of the invention is carried out on lignocellulosic matter other than *Miscanthus* (for example on other grasses such as bamboo, wheat straw, switchgrass, reed and straw; or on residual agricultural waste of e.g. as maize and sugar cane), then the different fractions are of lower purity. With other biomass species, the third extract may for example contain higher amounts of sugars and the third residue may for example contain a higher residual lignin content. In other words, the three extraction solvents are remarkably selective in the separation of each of the four components from the *Miscanthus*, viz. 1) the group of antioxidants, polyphenols, proteins, sterols, acids, alcohols, ketones, aldehydes and aromatic compounds; 2) the sugars; 3) the lignin; and 4) the cellulose. This high selectivity towards these components especially manifests when plant material of the species *Miscanthus giganteus* is used in the process.

Another advantage of the process of the invention is that the resulting cellulose has a higher degree of polymerization than when the *Miscanthus* is subjected to conventional methods, which for example lack a prehydrolysis step of hemicellulose (the extraction with the second extraction solvent) and/or make use of more harsh conditions such as steam explosion, kraft pulping or sulfite pulping. The relatively mild conditions lead to less degradation of the cellulose polymer chains, while at the same time they allow an effective and selective separation into the different components such as cellulose, hemicellulose and lignin.

FIG. 1 is a schematic representation of the process (1) of the invention, wherein the subsequent process steps are identified. The solid lines represent the steps that are essential to the invention, and the dotted lines optional process steps. First, the plant material of *Miscanthus* (10) is provided, which undergoes an extraction with the first extraction solvent to yield the first extract (11a) and the first residue (11b). From the first extract (11a), specific components or a mixture thereof (11a') may be isolated, while the first extraction solvent may be regenerated and re-used for the extraction from the plant material of *Miscanthus* (10). Thereafter, the first residue (11b) undergoes an extraction with the second extraction solvent to yield the second extract (12a) and the second residue (12b). From the second extract (12a), sugars (12a') may be isolated, while the second extraction solvent may be regenerated and re-used for the extraction from the first residue (11b). Thereafter, the second residue (12b) undergoes an extraction with the third extraction solvent, to yield the third extract (13a) and the third residue (13b). From the third extract (13a), lignin (13a') may be isolated, while the third extraction solvent may be regenerated and re-used for the extraction from the second residue (12b). Finally, the cellulose in the third residue (13b) may be isolated after one or more purification steps.

Figure 2:
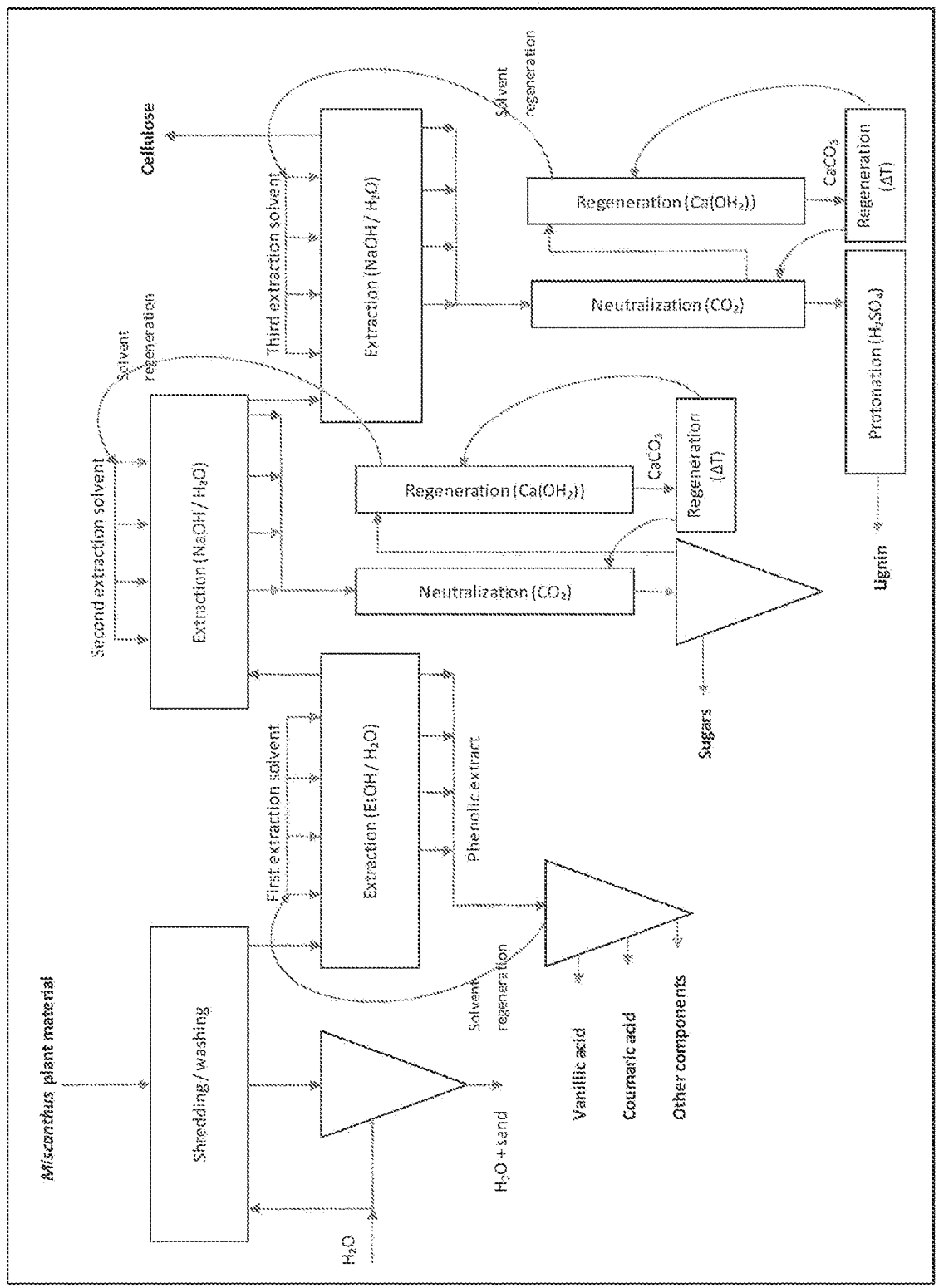
FIG. 2 displays a specific embodiment of the process (1) of the invention.

FIG. 2 represents an embodiment of the process (1) of the invention, wherein the following additional process steps occur; 1) an initial step wherein the raw plant material of *Miscanthus* is shredded and washed with water; 2) two steps wherein the alkaline extracts from the second and third extraction solvent are neutralized with $CO_2$; 3) two steps wherein the applied $CO_2$ is regenerated with the aid of $CaO/Ca(OH)_2$ under the formation of $Ca(CO_3)_2$; and 4) two steps wherein the applied $CaO/Ca(OH)_2$ is regenerated from the $Ca(CO_3)_2$. Further, the first extraction solvent in FIG. 2 is a mixture consisting of EtOH and water; and the third and second extraction solvents are aqueous NaOH solutions.

The invention further relates to cellulose, in particular cellulose fibers, obtainable by the process as described hereinabove.

The invention further relates to an object, in particular a plastic or concrete object, that is reinforced with cellulose obtainable by the process as described hereinabove, in particular with cellulose fibers obtainable by the process as described hereinabove.

The invention further relates to the use of cellulose, in particular cellulose fibers, derived from plant material of *Miscanthus* for the reinforcement of an object, in particular a plastic or concrete object.

Examples 1.1 Pretreatment and Extraction with the First Extraction Solvent

Plant material from the stem of *Miscanthus giganteus* (10 g) was copped into chips of 1-3 cm by using a Universal cutting mill CM 2000. The chips were washed with water (on a sieve) to remove dirt, in particular sand. The wet chips were left to drip out on a sieve for a few minutes and then contacted with 150 mL of a 70 wt. % ethanol solution in water at room temperature in a beaker. After stirring for two hours at room temperature (600 rpm, care was taken not to have any stationary matter in the beaker), the extract was separated from the lignocellulosic pulp over a Whatman 589/1 paper filter with a pore size of 12-25 μm. The residue was subjected to two more extractions with a 70 wt. % ethanol solution in water according to the same procedure as that of the first extraction. The combined extracts were evaporated to dryness under reduced pressure (50 mbar) at a temperature not exceeding 35° C. (rotary evaporator). The yield of extractives was 1.1 wt. % of vanillic acid, 0.6 wt. % of p-coumaric acid and 0.5 wt. % of other phenols, on a dry matter basis (of the initial *Miscanthus* plant material, see also Table 1). The solid fraction on the filter (i.e. the first residue) was collected for extraction with the second extraction solvent.

1.2 Extraction with the Second Extraction Solvent

The first extract was subjected to a 0.25 M NaOH solution in water which was then stirred during one hour at a temperature of 60-75° C. at atmospheric pressure to hydrolyze the hemicellulose into sugars. Thereafter, the supernatant with the dissolved sugars was separated from the solids by filtration over a Whatman 589/1 paper filter with a pore size of 12-25 μm. The liquid fraction (i.e. the second extract) was neutralized by the addition of carbon dioxide. After evaporation of the volatiles, the solid residue was found to contain 20 wt. % of xylose, 3.0 wt. % of other sugars and 2.0 wt. % of lignin, on a dry matter basis (of the initial *Miscanthus* plant material, see also Table 1). The minor amounts of lignin in the residue could be separated from the residue and combined with the lignin that was obtained by extraction with the third extraction solvent (see 1.3. below).

The solid fraction on the filter (i.e. the second residue) was collected for extraction with the third extraction solvent.

1.3 Extraction with the Third Extraction Solvent

The second extract was subjected to a 2.5 M NaOH solution in water which was then stirred during one hour at a temperature of 60-75° C. at atmospheric pressure to hydrolyze the lignin and disengage the cellulose. Thereafter, the supernatant with the dissolved lignin was separated from the solids by filtration over a Whatman 589/1 paper filter with a pore size of 12-25 μm. The liquid fraction (i.e. the third extract) was neutralized by the addition of carbon dioxide to precipitate the lignin. It was then made slightly acidic by the addition of dilute $H_2SO_4$, followed by washing with water to remove $CaCO_3$ and other water-soluble components. After evaporation of the volatiles, the solid residue was found to contain 18 wt. % of lignin, on a dry matter basis (of the initial *Miscanthus* plant material). The solid fraction on the filter (i.e. the third residue) was collected for further work-up to yield 50 wt. % of pure cellulose on a dry matter basis (of the initial *Miscanthus* plant material, see also Table 1).

TABLE 1

Components of *Miscanthus × giganteus* obtained with the process of the invention.

| Component | Wt. % (based on dry matter content) |
|---|---|
| vanillic acid | 1.1 |
| p-coumaric acid | 0.6 |
| other phenols | 0.5 |
| xylose | 20 |
| other sugars | 3.0 |
| lignin (second extract) | 2.0 |
| lignin (third extract) | 18 |
| cellulose | 50 |
| TOTAL | 95.2 |

The invention claimed is:
1. A process for the isolation of components from plant material of *Miscanthus*, the process comprising:
(i) providing plant material of *Miscanthus*; then
(ii) subjecting the plant material to an extraction with a first extraction solvent to yield a first residue and a first extract, wherein
(ii*a*) the first extraction solvent is a solvent mixture of water with at least 30 wt. % of at least one alcohol dissolved in the water, and
(ii*b*) the first extract comprises one or more compounds selected from the group consisting of antioxidants, polyphenols, proteins, sterols, acids, alcohols, ketones, aldehydes and aromatic compounds; then
(iii) subjecting the first residue to an extraction with a second extraction solvent to yield a second residue and a second extract, wherein
(iii*a*) the second extraction solvent comprises an aqueous solution of at least one metal hydroxide selected from the group consisting of LiOH, NaOH and KOH, wherein the at least one metal hydroxide is present in the second extraction solvent in a total concentration of 0.15-1.50 M; and
(iii*b*) the second extract comprises a plurality of sugars; then
(iv) subjecting the second residue to an extraction with a third extraction solvent to yield a third residue and a third extract, wherein

(iva) the third extraction solvent comprises an aqueous solution of at least one metal hydroxide selected from the group consisting of LiOH, NaOH and KOH, wherein the at least one metal hydroxide is present in the third extraction solvent in a total concentration of at least 2.5 M;

(ivb) the third extract comprises lignin; and (ivc) the third residue comprises cellulose.

2. The process according to claim 1, wherein the plant material is plant material of *Miscanthus × giganteus*.

3. The process according to claim 1, wherein step (ii) is practiced by extracting the plant material with the first extraction solvent at a temperature in a range of 15-35° C.

4. The process according to claim 1, wherein the first extraction solvent is a solvent mixture comprising ethanol and water in a weight ratio of the ethanol to the water in a range of 35:65 to 99.0:1.0.

5. The process according to claim 4, wherein the weight ratio of the ethanol to the water is in the range of 60:40 to 99.0:1.0.

6. The process according to claim 1, wherein the first extraction solvent is a solvent mixture consisting essentially of water and 60-85 wt. % of ethanol dissolved in the water.

7. The process according to claim 1, wherein the first extract comprises one or more compounds selected from the group consisting of p-coumaric acid, vanillic acid, vanillic acid glycoside, vanillic acid diglycoside, p-hydroxybenzaldehyde and vanillin.

8. The process according to claim 1, wherein the second extraction solvent is a 0.20-1.2 M solution of NaOH and/or KOH in water and/or wherein the third extraction solvent is a 4.5-20 M solution of NaOH and/or KOH in water.

9. The process according to claim 1, wherein steps (iii) and/or (iv) comprise respectively extracting the first residue and/or the second residue with the second and/or the third extraction solvent at a temperature in the range of 30-90° C.

10. The process according to claim 9, wherein the temperature is in the range of 40-80° C.

11. The process according to claim 1, further comprising subjecting the second extract and/or the third extract to a treatment which comprises adding an acid to the second extract and/or the third extract.

12. The process according to claim 1, which further comprises isolating the cellulose from the third residue.

13. The process according to claim 12, wherein the cellulose which is isolated from the third residue comprises cellulose fibers.

14. The process according to claim 1, wherein the alcohol of the first extraction solvent is at least one alcohol with 1, 2 or 3 carbon atoms.

15. The process according to claim 1, wherein the alcohol of the first extraction solvent is at least one alcohol selected from the group consisting of methanol, ethanol, 1-propanol, 2-propanol, ethanediol, 1,2-propanediol and 1,3-propanediol.

16. The process according to claim 1, which further comprises subjecting the second extract to a treatment to regenerate the second extraction solvent therefrom by the sequential steps of:

a) adding $CO_2$ to the second extract to reach a pH in the range of 6-11;

b) separating the composition resulting from step a) into a first fraction containing sugars and a second fraction containing an aqueous metal carbonate solution;

c) adding CaO and/or $Ca(OH)_2$ to the second fraction to generate precipitated $CaCO_3$ and thereby regenerate the second extraction solvent;

d) burning the precipitated $CaCO_3$ to regenerate $CO_2$ and CaO; and then e) using the regenerated $CO_2$ in step a) and/or using the regenerated CaO in step c).

17. The process according to claim 16, wherein the step of treating the second extract to regenerate the second extraction solvent therefrom further comprises the steps of:

f) subjecting the first fraction to one or more purification steps to isolate one or more of the sugars; and g) optionally subjecting the first residue to an extraction with the regenerated second extraction solvent.

18. The process according to claim 17, wherein step f) is practiced to isolate xylose from the first fraction.

19. The process according to claim 1, which further comprises subjecting the third extract to a treatment to regenerate the third extraction solvent therefrom by the sequential steps of:

a) adding $CO_2$ to the third extract to precipitate the lignin therefrom and create a supernatant containing an aqueous metal carbonate solution;

b) separating the lignin from the supernatant;

c) adding CaO and/or $Ca(OH)_2$ to the supernatant to generate precipitated $CaCO_3$ and thereby regenerate the third extraction solvent;

d) burning the precipitated $CaCO_3$ to generate $CO_2$ and CaO; and then e) using the regenerated $CO_2$ in step a) and/or using the regenerated CaO in step c).

20. The process according to claim 19, wherein the step of treating the third extract to regenerate the third extraction solvent therefrom further comprises the step of:

f) subjecting the lignin to one or more purification steps.

21. A process for the isolation of components from plant material of *Miscanthus*, the process comprising:

(i) providing plant material of *Miscanthus*; then (ii) subjecting the plant material to an extraction with a first extraction solvent to yield a first residue and a first extract, wherein (iia) the first extraction solvent is a solvent mixture of water with at least 30 wt. % of at least one alcohol dissolved in the water, and (iib) the first extract comprises one or more compounds selected from the group consisting of antioxidants, polyphenols, proteins, sterols, acids, alcohols, ketones, aldehydes and aromatic compounds; then (iii) subjecting the first residue to an extraction with a second extraction solvent to yield a second residue and a second extract, wherein (iiia) the second extraction solvent comprises an aqueous solution of at least one metal hydroxide selected from the group consisting of LiOH, NaOH and KOH, wherein the at least one metal hydroxide is present in the second extraction solvent in a total concentration of 0.15-1.50 M; and (iiib) the second extract comprises a plurality of sugars; then (iv) subjecting the second residue to an extraction with a third extraction solvent to yield a third residue and a third extract, wherein (iva) the third extraction solvent comprises an aqueous solution of at least one metal hydroxide selected from the group consisting of LiOH, NaOH and KOH, wherein the at least one metal hydroxide is present in the third extraction solvent in a total concentration of at least 2.5 M;

(ivb) the third extract comprises lignin; and (ivc) the third residue comprises cellulose, and (v) the process further comprises subjecting the second extract to a treatment to regenerate the second extraction solvent therefrom by the sequential steps of:
   a) adding $CO_2$ to the second extract to reach a pH in the range of 6-11;
   b) separating the composition resulting from step a) into a first fraction containing sugars and a second fraction containing an aqueous metal carbonate solution;
   c) adding CaO and/or $Ca(OH)_2$ to the second fraction to generate precipitated $CaCO_3$ and thereby regenerate the second extraction solvent;
   d) burning the precipitated $CaCO_3$ to regenerate $CO_2$ and CaO; and
   then e) using the regenerated $CO_2$ in step a) and/or using the regenerated CaO in step c).

22. The process according to claim 21, wherein the step (v) of treating the second extract to regenerate the second extraction solvent therefrom further comprises the steps of:
   f) subjecting the first fraction to one or more purification steps to isolate one or more of the sugars; and
   g) optionally subjecting the first residue to an extraction with the regenerated second extraction solvent.

23. The process according to claim 22, wherein step f) is practiced to isolate xylose from the first fraction.

24. A process for the isolation of components from plant material of *Miscanthus*, the process comprising:
   (i) providing plant material of *Miscanthus*; then
   (ii) subjecting the plant material to an extraction with a first extraction solvent to yield a first residue and a first extract, wherein
     (ii$a$) the first extraction solvent is a solvent mixture of water with at least 30 wt. % of at least one alcohol dissolved in the water, and
     (ii$b$) the first extract comprises one or more compounds selected from the group consisting of antioxidants, polyphenols, proteins, sterols, acids, alcohols, ketones, aldehydes and aromatic compounds; then
   (iii) subjecting the first residue to an extraction with a second extraction solvent to yield a second residue and a second extract, wherein
     (iii$a$) the second extraction solvent comprises an aqueous solution of at least one metal hydroxide selected from the group consisting of LiOH, NaOH and KOH, wherein the at least one metal hydroxide is present in the second extraction solvent in a total concentration of 0.15-1.50 M; and
     (iii$b$) the second extract comprises a plurality of sugars; then
   (iv) subjecting the second residue to an extraction with a third extraction solvent to yield a third residue and a third extract, wherein
     (iv$a$) the third extraction solvent comprises an aqueous solution of at least one metal hydroxide selected from the group consisting of LiOH, NaOH and KOH, wherein the at least one metal hydroxide is present in the third extraction solvent in a total concentration of at least 2.5 M;
     (iv$b$) the third extract comprises lignin; and
     (iv$c$) the third residue comprises cellulose, and
   (v) the process further comprises subjecting the third extract to a treatment to regenerate the third extraction solvent therefrom by the sequential steps of:
     a) adding $CO_2$ to the third extract to precipitate the lignin therefrom and create a supernatant containing an aqueous metal carbonate solution;
     b) separating the lignin from the supernatant;
     c) adding CaO and/or $Ca(OH)_2$ to the supernatant to generate precipitated $CaCO_3$ and thereby regenerate the third extraction solvent;
     d) burning the precipitated $CaCO_3$ to generate $CO_2$ and CaO; and then
     e) using the regenerated $CO_2$ in step a) and/or using the regenerated CaO in step c).

25. The process according to claim 24, wherein the step of treating the third extract to regenerate the third extraction solvent therefrom further comprises the step of:
   f) subjecting the lignin to one or more purification steps.

* * * * *